Nov. 12, 1968  F. W. BLAKE  3,410,569
CASTER-WHEELED FARM CART
Filed Nov. 7, 1966  3 Sheets-Sheet 1
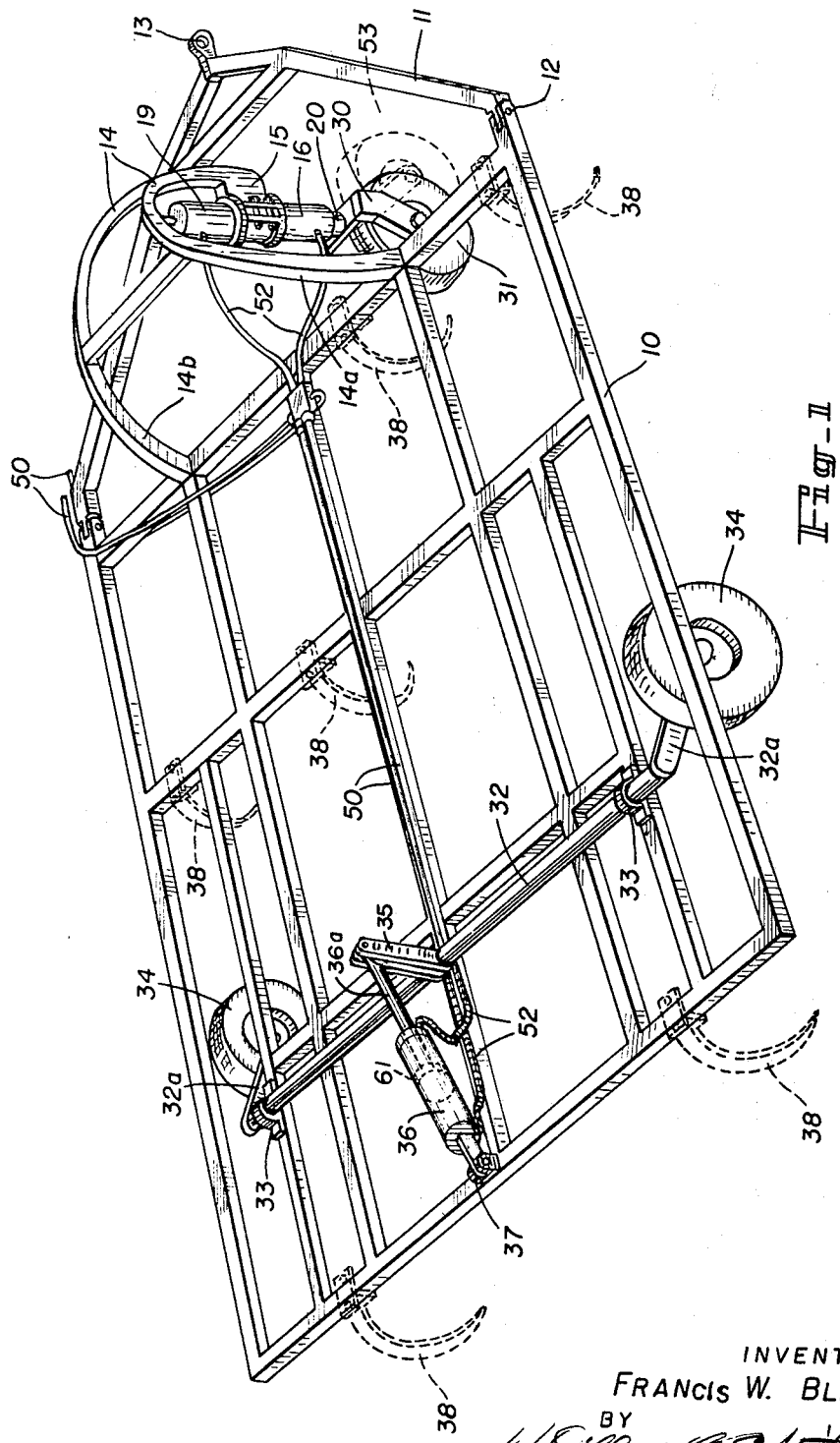
Fig-II
INVENTOR
FRANCIS W. BLAKE
BY
ATTORNEY

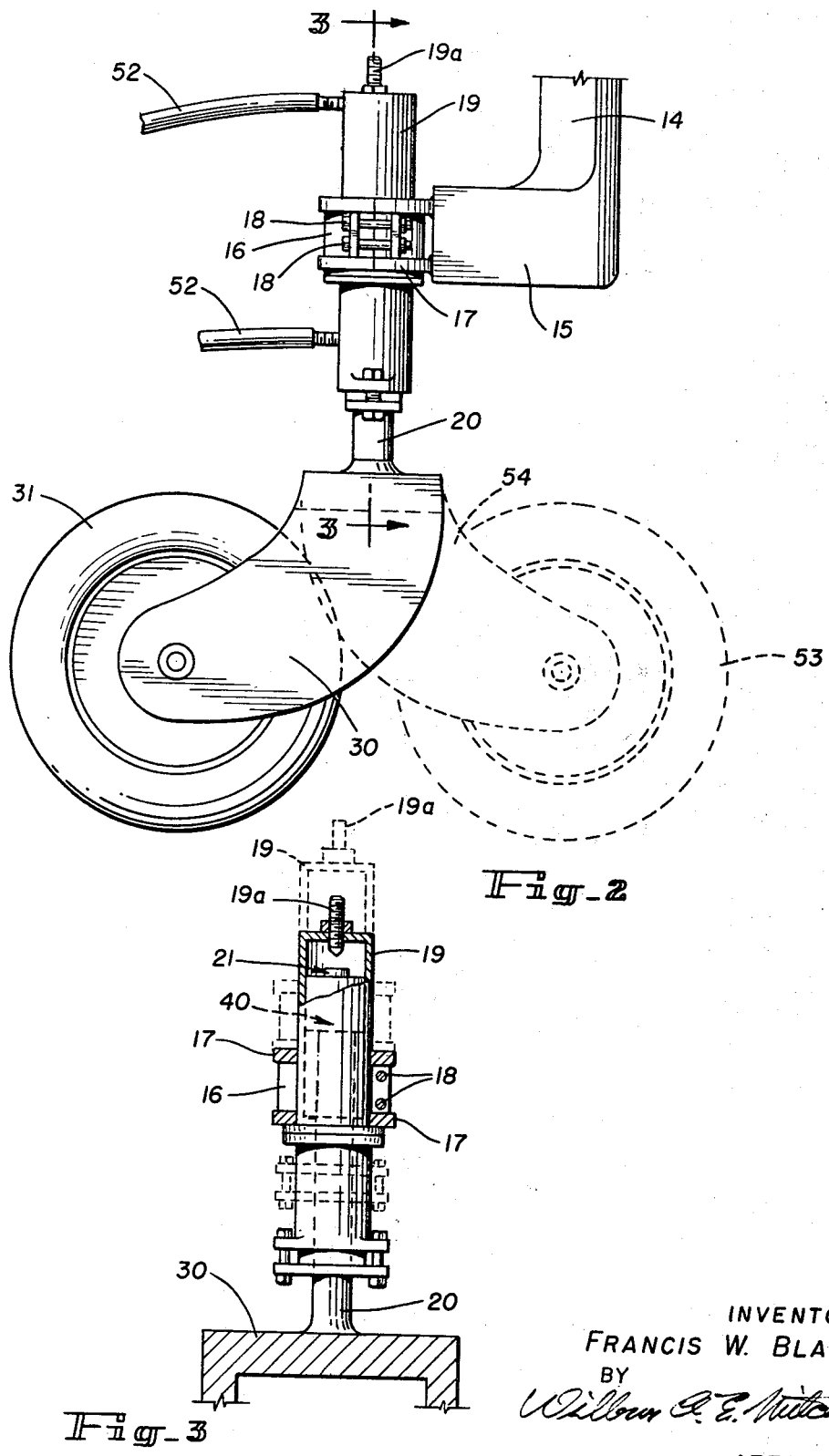

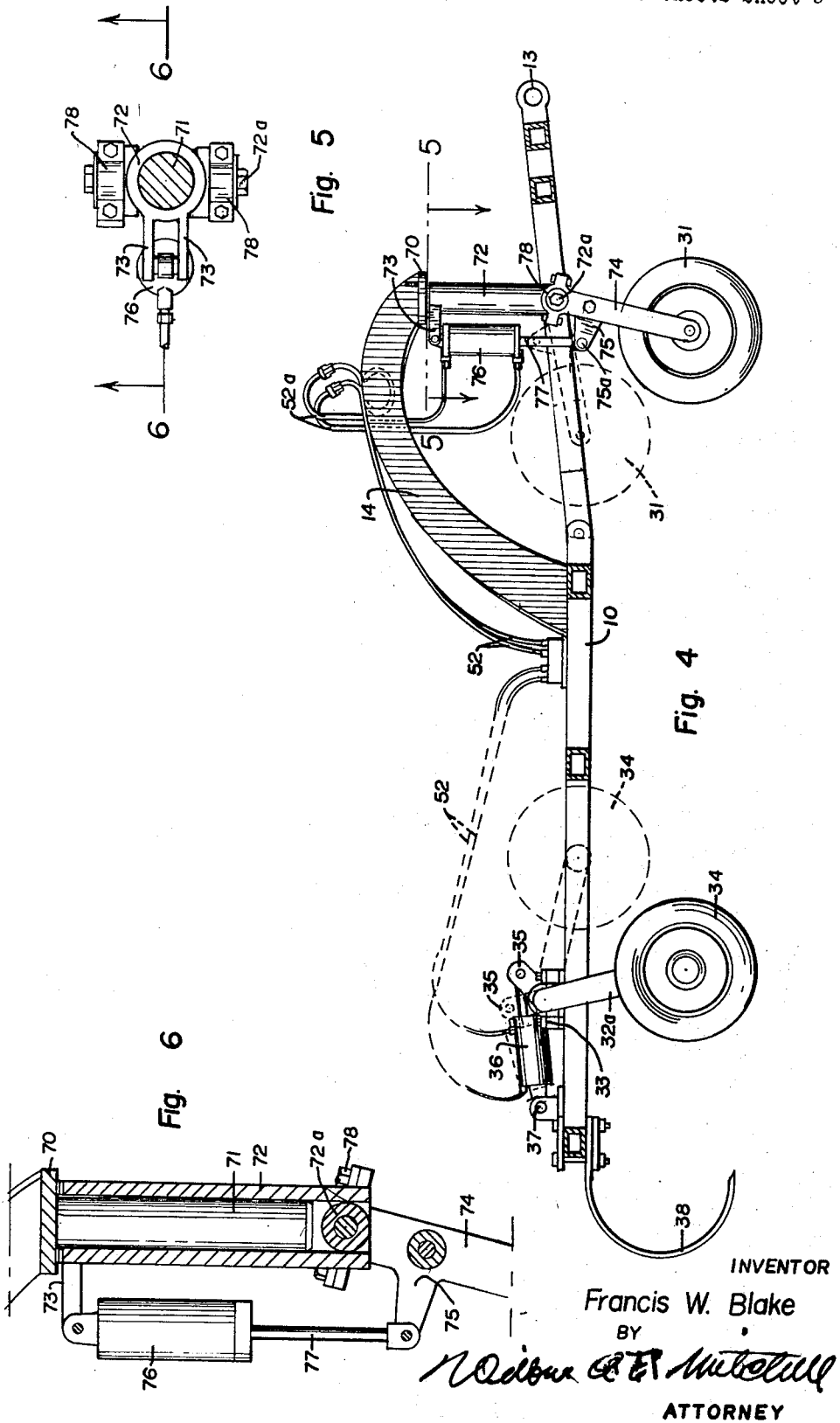

United States Patent Office 3,410,569
Patented Nov. 12, 1968

3,410,569
CASTER-WHEELED FARM CART
Francis W. Blake, Hereford, Colo. 80732
Filed Nov. 7, 1966, Ser. No. 598,137
3 Claims. (Cl. 280—43.23)

ABSTRACT OF THE DISCLOSURE

A plural-wheeled farm cart, with the wheels pivotally mounted for unison vertical arc movement with relation to the frame, for raising and lowering of the frame, and with one of said wheels being the only front wheel thereof and that front wheel being also caster mounted and being also adapted for 360 degree horiozntal rotational movement in a well of the frame.

---

This invention relates to farm machinery, generally, and to farm implement carts having a horizontally elevatable frame, having wheels and adapted to be towed by a non-rigid tow bar. My invention is directed to an implement cart having a horizontal frame, adapted to receive a large variety of attachable ground working tools interchangeably mounted thereon, having three elevatable wheels on and operable with relation to the frame, including a novel front caster wheel, for causing a horizontal raising and lowering of the frame in parallel relationship to the ground, by suitable power-lift means. More particularly, my farm cart is of the large frame implement cart type, adapted for interchangeable mounting of different farm tools thereon, such as in summer fallowing of the soil, illustrated as having dry land chisel blades secured thereto.

Such conventional farm carts, as far as known, with their plurality of wheels, are not adapted for short radius turning when the end of the field is reached, and considerable time and space are wasted in their use in making a complete 180 degree turn to realign the tool in the opposite direction. To overcome that inefficient operation of conventional farm tool carts, I have designed a novel farm cart with three wheels and with the improvement of one of the wheels, as the front wheel, being mounted in a novel caster mounting relationship to the frame to permit free 360 degree horiozntal swiveling thereof.

Another objective is the provision on such a farm cart with a single front, freely 360 degrees rotatable, caster wheel and horizontal frame wheel-lift combination.

Another objective is the provision in a farm cart of a single front caster mounted wheel, adapted to be elevatable and for free rotation, by the use of a conventional double acting hydraulic cylinder mounted on and carried by the frame and comprising the vertical axis for the caster wheel.

Another object is the provision on the frame for such a farm tool carrier of a goose-neck wheel mounting as an integral part of the frame for such vertical axis hydraulic cylinder mounting therein, to permit 360 degree horizontal rotation of the caster wheel on the axis of said cylinder within said well.

It is also an object of the invention to provide a hydraulic power actuated lift on a farm implement cart of the type described, having a plurality of wheels, and wherein the frame of the cart is adjusted vertically relative to and by the supporting wheels thereof to regulate the operational depth of the farm tool in the ground.

Other and further objectives of my invention will be apparent to those skilled in the art from the following detailed explanation of the drawings of a preferred embodiment thereof and in which drawings:

FIGURE 1 is an elevational or perspective view of a farm cart of the type described, having my invention therewith;

FIGURE 2 is a fragmentary enlarged, or partial side view of my novel caster wheel, showing the mounting thereof on the frame;

FIGURE 3 is a fragmentary sectional view on the line 3—3 in FIGURE 2;

FIGURE 4 is a vertical sectional view of a modified form of a front caster wheel on my farm cart;

FIGURE 5 is a sectional view on the line 5—5 of FIGURE 4, looking in the direction of the arrows; and FIGURE 6 is an enlarged, partial, vertical, sectional view on line 6—6 of FIGURE 4.

In the drawings, similar characters of reference indicate corresponding parts in the several views.

Referring now to the characters of reference in the drawings, the farm tool cart frame, on which the invention is embodied, comprises a substantially rectangular shaped, rigid and flat frame, 10, provided with a rigid but hinged, A-shaped tow bar, 11, hinged at the front of the frame at 12 and having a tow connection opening, 13, at the front thereof.

I provide a strong, rigid, goose-neck frame extension member, 14, comprising members 14a and 14b secured to the frame front cross-bar, of the configuration illustrated, and which are securely joined together at their forward and downward arc ends, as at 15, by being welded to the projecting stub-bar member 15. I provide a split, spring sleeve collar member 16, having reinforced shoulders and outer flanges 17, and I weld the shoulders to the inside surface of projection 15, as illustrated. The collar 16 is of a size sufficient to permit a conventional hydraulic cylinder to be secured within that collar, as illustrated. Aligned pairs of holes are provided in the aligned parallel outer flanges 17 of the collar 16 to receive bolts 18 therethrough. When the bolts are secured in place the collar 16 is thereby compressed and completely and securely holds the cylinder 19 therein and to the goose-neck projection, 15, as illustrated.

It will be observed that I provide the novel gooseneck frame extension, 14, as shown, to provide a well thereunder and within which well I mount the double-acting hydraulic cylinder, 19. The cylinder 19 is slidably disposed in said sleeve collar 16 and projections 17, and is normally held or clamped in immovable relation thereto by securing bolts 18. A piston rod, 20, slidably projects from the lower end of the cylinder 19, and is actuated by the piston in the cylinder, 21, of conventional construction, and which slidably operates within the cylinder 19. It is to be noted in connection therewith that the rod, 20, and its piston, 21, are rotatable within the cylinder 19. The lower end of the rod, 20, is securely welded to a conventionally shaped caster sprocket, 30, and within that sprocket a wheel, 31, is conventionally rotatably mounted. The upper end of the cylinder is fitted with an axially adjustable stop screw member, 19a, which limits upward movement of the piston 21 in the cylinder 19. Thus the novel combination of the goose-neck frame extension formed into a well, and within which well the hydraulic, double-acting, cylinder is carried in vertical position, and a caster wheel mounted directly in extension of and onto the piston rod extending downwardly from the piston within that hydraulic cylinder, are to be noted as providing the novel construction whereby the longitudinal axis of the hydraulic cylinder also constitutes the vertical pivot axis for the horizontally 360 degree, freely rotatable, caster wheel within that well, and whereby, at the same time, the double-acting hydraulic cylinder provides the means for elevating and lowering the frame with relation to that wheel, by hydraulic power means, as will be further explained. Such movement of the frame is accomplished by the hydraulic double-acting ram cylinder being conventionally adapted for hydraulic fluid insertion into the cylinder on either side of the piston, 21, thereof.

The rear of the frame, 10, at the left as viewed in FIGURE 1, is provided with an aligned pair of wheels, 34, adapted by conventional pivot-crank mounting on the frame to be moved in unison with relation to the frame by hydraulic ram cylinder means, 36, and thereby to cause a raising or lowering of the horizontal plane of the frame with relation to the ground and the wheels, 34. I pivotally mount a rotatable U-shaped crank, 32, having equally aligned crank arm ends, 32a, extending therefrom, by conventional journal bearings 33, onto the frame, 10, adjacent its rear. A pair of identical rotatable wheels, 34, is secured to the outer ends of the identical arms 32a. The rotatable member, 32, is provided with a pair of spaced stub-cranks, 35, extending radially therefrom at about a 90 degree radius thereon with relation to the radius of the crank arms 32a. A second conventional hydraulic, double-acting, cylinder-piston member 36 is suitably pivotally secured to this portion of the frame, at pivot point 37 provided for the purpose. Cylinder 36 is similar to cylinder 19 in construction; being double-acting and having an internal hydraulic slidable piston and a piston rod extension, 36a, therefrom, projecting in longitudinal alignment from the conventional open end thereof. Rod 36a is suitably pivoted to and between stub-cranks 35.

A pair of pipes, 50, extend along a bar member of the frame 10, with the pipe ends being connected with flexible hoses, 52, at the forward end of the pipes leading to opposed parts of the cylinder 19, while at the rear end of the frame pipes 50 are connected to similar flexible hoses 52 leading to corresponding parts of the cylinder 36. The pipes 50 are connected by suitable conduits (not shown) with a hydraulic pump and valve assembly on the tractor or other vehicle and which assembly is operative to feed fluid under pressure to either pipe, 50, in conventional manner.

OPERATION

In operation of my preferred modification just described, as shown in FIGURES 1, 2 and 3, the hydraulic cylinder, 19, as explained, is clampingly held within and by the sleeve collar, 16, in such vertical position that the wheel 31, carried by the piston rod 20, and in such relative position, through its piston 21 and piston rod 20, with fluid pressure equally applied in cylinders 19 and 36, so that frame 10 is substantially horizontal, by wheels 34, 34 and 31 being vertically equal with relation to the plane of frame 10. By the construction shown and explained, all three wheels are movable vertically in unison with relation to the horizontal plane of the frame 10.

When it is desired to raise frame 10 and thereby raise the chisels 38 out of the ground, as when turning the implement cart at the end of a field, fluid under pressure is introduced into the top part of the cylinder 19 and into the rear or left hand part, as viewed in FIGURE 1, of cylinder 36; resulting in movement, in the case of cylinder 19, by the cylinder relative to its piston 21 moving upwardly thereby affecting a raising action of that front end of the frame 10; and resulting in the case of cylinder 36, in a movement of the piston and its rod 36a to the right, as shown, thus rotating the crank 32 clockwise and thereby through the wheels 34 and cranks 32a resulting in upward movement of that rear portion of the frame 10, or of the left portion as viewed in FIGURE 1; thus raising the entire frame in unison, and with it the chisels are raised out of the ground. After the chisels have been lifted out of the ground, and the farm implement cart turn negotiated at the end of the field, the farmer reverses the hydraulic pressure, just explained, conventionally introducing a pressure onto the other side of the pistons, respectively in cylinders 19 and 36, which affects a lowering movement of the frame with relation to the ground and a consequent re-entry of the chisel blades into the soil.

It is important to note, with the frame raised and the chisels out of the ground, as just explained, with the cart movable on its wheels, that a sharp radius turn can be efficiently and quickly made as a result of my invention, because of my novel frame-goose-neck combination with the pivoted, single, caster wheel as shown. My novel cart permits a sharp radius turning with one of the rear wheels, 34, substantially acting as the center pivot point, on which pivot point the entire cart can be pivoted as a result of the freely rotatable caster wheel 31 following in a turning on that point. Also it is to be noted that there can be a backing or other movement of the farm cart as a result of my novel 360 degree, freely rotatable, caster wheel mounting, permitting that front caster wheel to rotate into any needed position.

I show a modification of my method of mounting my novel, single, front, caster wheel in FIGURES 4, 5 and 6. In this modification I join the front of my goose-neck frame extension members, 14, together at a horizontal enlarged bearing shoulder, 70, and extend an integrally vertical round king-pin, 71, downwardly vertically therefrom. I mount an inverted T-shaped rotatable cylinder sleeve member, 72, on the vertical shaft, 71, with the leg of the T being cylindrical and of an inside diameter to fit snugly over the shaft, 71, but for rotation of 71, and with cross arms, 72a, extending from 72 in diametrically opposed relationship therefrom and at the lower end thereof as illustrated. Shoulder 70 is larger in outer diameter than the outside diameter of cylinder sleeve 72. I provide conventional wheel sprocket, 74, to carry the front wheel 31, and with the upper portion of that sprocket having a suitable pair of bifurcated clamp bearings, 78, suitably, conventionally, mounted upon the arm 72a for rotation of the sprocket upwardly and downwardly on the stub-arms 72a, in conventional manner. The top of the cylindrical portion, 72, has a radial stub-arm 73, as shown, extending therefrom. The wheel sprocket 74 has a stub-arm 75 extending at a right angle therefrom, as shown, of substantially the same length as stub-arm 73. I pivotally mount a conventional, double-acting, hydraulic ram cylinder and piston 76–77 between the ends of the stub-arms 73 and 75. The front ends of the hydraulic hoses, 52, in corresponding relationship with the rear hydraulic cylinder 36, are connected in conventional manner to this hydraulic cylinder 76 by hoses 52a. That connection of the hoses 52a is a loose or looped connection to permit extra length of the hoses upon a pivoting of the front wheel assembly on its king-pin axis, 71, as will be understood. It will be seen that expansion of the conventional cylinder 76, by its piston rod 77, will cause the sprocket to pivot on its pivot 72a, and conversely, contraction of piston 77 within cylinder 76 will cause the sprocket 74 to pivot similarly on pivot connection 72a, for a raising or lowering of the frame, 10, respectively, with relation to the ground, since the wheel 31 rests on the ground. This modification of my front caster wheel is economical in construction and maintenance. The operation of this front caster wheel modification, FIGURES 4, 5 and 6, is identical with the operation in the prior, preferred construction; namely: a common source of hydraulic power, not illustrated, but understood to be by hydraulic tubes 50, similar to that of FIGURE 1, from a tractor, will act to pivotally operate both my front single caster wheel and my pair of rear wheels, in terms of raising and lowering them simultaneously and equally in relation to the frame, and thereby effecting a raising of the frame with relation to the ground, with the frame always being horizontal to the ground, in such operation. That horizontal frame operation is due to the equal arc pivoting of the front wheel and the rear wheels, by their respective cylinders 36 and 76, as a result of the stub-crank 35 of the rear wheels being of an arc equal to that of the arc measured by the distance between the front wheel pivot point 72a and the lower cylinder rod, 77, pivot point at 75a of the front wheel, as will be understood.

From the foregoing description it will be readily seen that I have produced a large farm implement cart which substantially fulfills the objectives set forth herein.

While this specification sets forth my preferred construction, in practice deviations therefrom may be resorted to as would not form a departure from the spirit of my invention, as defined by the hereunto appended claims, therefore I wish to be bound only by the hereunto appended claims.

What I claim and desire to secure by Letters Patent is:

1. In a farm tool carrying cart, the combination with a rigid horizontally flat frame having a non-rigid tow-bar and having two ends, a pair of identical wheels operably pivotally mounted on and carried by the frame at one end thereof for equal elevation with relation thereto by a first hydraulic cylinder-piston mounted on the frame and operable by hydraulic power, means for so mounting said wheels, another elevatable single pivotally operably mounted wheel on and carried by the other end of the frame and adapted for simultaneous elevation with said pair of wheels and with relation to the frame by a second hydraulic cylinder-piston on the frame and also operable by hydraulic power, means for so mounting said second wheel, a common source of hydraulic power, and pipe connections for conducting such power from its source to said cylinders, of the other end of the frame being formed as a gooseneck wheel-well extension having the second hydraulic cylinder secured to and vertically carried by said gooseneck extension, means for so securing the second cylinder thereto, the second cylinder-piston having a piston-rod extending down therefrom, the other single wheel being also carried by and mounted for vertical pivotal movement with relation to and at the lower end of the gooseneck extension, means for so mounting the other single wheel, said other single wheel vertical pivotal movement being effected by said second hydraulic cylinder, and the other single wheel being 360 degree freely horizontally caster rotatable substantially within said wheel-well extension, the lower end of the gooseneck frame extension comprising a king-pin like mounting means for the other single wheel.

2. In a farm tool carrying cart, the combination with a rigid horizontally flat frame having a non-rigid tow-bar and having two ends, a pair of identical wheels operably pivotally mounted on and carried by the frame at one end thereof for equal elevation with relation thereto by a first hydraulic cylinder-piston mounted on the frame and operable by hydraulic power, means for so mounting said wheels, another single wheel operably pivotally mounted on and carried by the other end of the frame and adapted for simultaneous elevation with relation thereto by a second hydraulic cylinder-piston mounted on the other end of the frame, means for so mounting said second wheel including said hydraulic cylinder piston and piston rod, a source of such hydraulic power, and pipe connections for conducting such power from its source to said cylinders, of the other end of the frame formed as a gooseneck wheel-well extension and to and within which well the second hydraulic cylinder is vertically secured and rotatably carried, means for so securing the second cylinder thereto, the second cylinder-piston having a piston-rod extending downwardly therefrom, the other single wheel being pivotally carried and mounted at both the lower end of the gooseneck extension and the lower end of the piston-rod, vertically pivotal arc means for so mounting the second wheel to said piston-rod and frame gooseneck end, the rod of the second hydraulic cylinder-piston and its single wheel being 360 degrees freely horizontally rotatable on the gooseneck extension end and within said frame well.

3. In a farm implement having a horizontal rigid frame with earth-working tools secured thereon and extending therebelow, a wheel well formed in the frame at one end thereof, a plurality of vertically pivotally-arc unison operable lowerable and raisable wheels secured to the frame for thereby raising and lowering the frame in a uniform level plane into and out of ground operable contact of the tools, hydraulic ram means carried by the frame for effecting such uniform vertical pivot-arc wheel unison operation, the combination therewith of one of said vertical arc-pivotal wheels also being a horizontally rotatable caster wheel secured to the frame within said frame well by a vertical king-pin-like caster mounting means, said caster mounting means comprising a round post vertically downwardly extending from said frame adjacent the well, a sleeve collar three hundred and sixty degree horizontally rotatably held on said post, a vertically-pivotal wheel sprocket means so pivoted to the under portion of the exterior of said sleeve collar and with that wheel mounted in said sprocket, a lateral shoulder extending from the outer periphery of said sleeve collar, a pivot bearing extending laterally from the wheel sprocket means and in vertical alignment with said shoulder extension, and a hydraulic ram-cylinder having a piston rod extending therefrom and with the end of its cylinder opposite its rod being pivotally secured to said shoulder extension and with the lower end of the piston rod extending from the cylinder being pivotally secured to said pivot bearing extension of the sprocket means, said cylinder being so mounted externally of and substantially vertically parallel with said caster vertical post and the rotatable sleeve collar on the post and being three hundred sixty degrees horizontally rotatable with the caster wheel and said sleeve collar on said post.

References Cited

UNITED STATES PATENTS

| | | | |
|---|---|---|---|
| 425,654 | 4/1890 | Brown | 280—43.13 |
| 3,091,476 | 5/1963 | Blake | 280—43.13 |
| 3,286,985 | 11/1966 | Edera | 280—43.23 |
| 3,287,024 | 11/1966 | Ulinski | 280—43.23 |
| 2,875,839 | 3/1959 | Spinks | 180—9.34 |
| 2,059,205 | 11/1936 | Buffington | 172—421 |

BENJAMIN HERSH, *Primary Examiner.*

R. SONG, *Assistant Examiner.*